(12) United States Patent
Garcia et al.

(10) Patent No.: US 11,335,095 B1
(45) Date of Patent: May 17, 2022

(54) SYSTEMS AND METHODS FOR CHARACTERIZING VISUAL CONTENT

(71) Applicant: GoPro, Inc., San Mateo, CA (US)

(72) Inventors: Vincent Garcia, Issy-les-Moulineaux (FR); Balthazar Neveu, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 374 days.

(21) Appl. No.: 16/552,118

(22) Filed: Aug. 27, 2019

(51) Int. Cl.
| | | |
|---|---|---|
| G06V 20/00 | (2022.01) | |
| G06V 20/40 | (2022.01) | |
| G06F 16/75 | (2019.01) | |
| G06F 16/78 | (2019.01) | |
| G06T 3/00 | (2006.01) | |
| G06F 16/783 | (2019.01) | |

(52) U.S. Cl.
CPC .............. *G06V 20/46* (2022.01); *G06F 16/75* (2019.01); *G06F 16/783* (2019.01); *G06F 16/7867* (2019.01); *G06T 3/0087* (2013.01); *G06V 20/49* (2022.01)

(58) Field of Classification Search
CPC .............. G06K 9/6224; G06K 9/00718; G06F 16/9535; G06F 16/738; G06F 16/7867; G06F 16/7837; G06F 16/9024; H04N 9/3185; H04N 9/3176; H04N 13/172; H04N 13/161; G06N 3/08; G01B 11/2518; G03B 21/2046; G11B 27/02; G11B 27/031
See application file for complete search history.

(56) References Cited

U.S. PATENT DOCUMENTS

| | | | | |
|---|---|---|---|---|
| 9,058,385 | B2 * | 6/2015 | Kocks | G06K 9/00718 |
| 9,204,138 | B2 * | 12/2015 | Bennett | H04N 13/383 |
| 9,342,210 | B2 * | 5/2016 | Kane | G06F 3/0481 |
| 9,607,654 | B2 * | 3/2017 | Leppanen | H04N 5/91 |
| 10,284,809 | B1 * | 5/2019 | Noel | H04N 5/9305 |
| 10,455,297 | B1 * | 10/2019 | Mahyar | G10L 15/1815 |
| 10,469,818 | B1 * | 11/2019 | Gilquin | H04N 13/189 |
| 10,587,855 | B1 * | 3/2020 | Chinnaiyan | H04N 5/23238 |
| 10,592,557 | B2 * | 3/2020 | Standefer, III | G06F 16/9038 |
| 10,777,228 | B1 * | 9/2020 | Wilson | G06N 3/0445 |
| 10,832,730 | B2 * | 11/2020 | Doherty | G06F 3/0488 |
| 2014/0359531 | A1 * | 12/2014 | Xiang | G06F 16/9535 715/835 |

* cited by examiner

*Primary Examiner* — Amir Alavi
(74) *Attorney, Agent, or Firm* — Esplin & Associates, PC (57) ABSTRACT

Visual content may be captured by an image capture device. The characteristics of the visual content may be determined based on assessment of separate visual content and without assessment of the visual content. The assessment of the separate visual content may include identification of thing(s) depicted within the separate visual content. The separate visual content may be temporally and/or spatially separate from the visual content.

18 Claims, 6 Drawing Sheets

SYSTEMS AND METHODS FOR CHARACTERIZING VISUAL CONTENT

FIELD

This disclosure relates to visual content characterization based on separate visual content.

BACKGROUND

Characterization of visual content may enable user-friendly consumption of the visual content. Including visual clues within the visual content to facilitate characterization of the visual content may comprise the visual content.

SUMMARY

This disclosure relates to visual content characterization. Visual information other information may be obtained. The visual information may define visual content. The visual content may include first visual content, second visual content, and/or other visual content. The first visual content may be separate from the second visual content such that the second visual content is not presented during presentation of the first visual content. The second visual content may be assessed. The assessment of the second visual content may enable characterization of the first visual content without assessment of the first visual content. One or more characteristics of the first visual content may be determined based on the assessment of the second visual content and/or other information.

A system that characterizes visual content may include one or more electronic storages, one or more processors, and/or other components. An electronic storage may store visual information defining visual content, information relating to visual content, information relating to assessment of visual content, information relating to characterization of visual content, and/or other information.

The processor(s) may be configured by machine-readable instructions. Executing the machine-readable instructions may cause the processor(s) to facilitate characterizing visual content. The machine-readable instructions may include one or more computer program components. The computer program components may include one or more of a visual information component, an assessment component, a characteristic component, and/or other computer program components.

The visual information component may be configured to obtain visual information and/or other information. Visual information may define visual content and/or other content. The visual content may include first visual content, second visual content, and/or other visual content. Different visual content may be separate such that presentation of one visual content does not include presentation of other visual content. For example, the first visual content may be separate from the second visual content such that the second visual content is not presented during presentation of the first visual content.

In some implementations, different visual content may be temporally separate. For example, the first visual content may be temporally separate from the second visual content. Temporally separate visual content may include visual content captured at different moments. For example, the first visual content may be captured at a first moment and the second visual content may be captured at a second moment different from the first moment.

Temporally separate visual content may be defined within a single video or within separate videos. For example, the first visual content may be defined within a first temporal portion of a video and the second visual content may be defined within a second temporal portion of the video. The first temporal portion of the video may be adjacent to the second temporal portion of the video. As another example, the first visual content may be defined within a first video and the second visual content may be defined within a second video. The first video and the second video may be sequentially captured by an image capture device.

In some implementations, different visual content may be spatially separate. For example, the first visual content may be spatially separate from the second visual content. Spatially separate visual content may include visual content including depiction of different views of a scene. For example, the first visual content may include depiction of a first field of view of a scene and the second visual content may include depiction of a second field of view of a scene different from the first field of view of the scene.

Spatially separate visual content may be defined within a single video/image or within separate videos/images. For example, the first visual content may be defined within a first spatial portion of a spherical video/image and the second visual content may be defined within a second spatial portion of the spherical video/image. The first spatial portion of the spherical video/image may be opposite of the second spatial portion of the spherical video/image. As another example, the first visual content may be defined within a first video/image and the second video content may be defined within a second video/image. Spatially separate visual content may be captured by a single image capture device or by separate image capture device. For example, both the first visual content and the second visual content may be captured by a single image capture device. The first visual content may be captured by a first image capture device and the second visual content may be captured by a second image capture device.

The assessment component may be configured to assess at least one of the visual content. Assessment of one visual content may enable characterization of another visual content without assessment of the other visual content. For example, the assessment component may be configured to assess the second visual content. The assessment of the second visual content may enable characterization of the first visual content without assessment of the first visual content.

In some implementation, the visual content may be assessed to identify one or more things depicted within the visual content. For example, the second visual content may be assessed to identify one or more things depicted within the second visual content.

In some implementations, the visual content may be assessed to determine whether or not the visual content includes a dark image. For example, the second visual content may be assessed to determine that the second visual content includes a dark image.

The characteristic component may be configured to determine one or more characteristics of at least one of the visual content based on the assessment of another visual content and/or other information. The characteristic(s) of the visual content may be determined without assessment of the visual content. For example, the characteristic component may be configured to determine one or more characteristics of the first visual content based on the assessment of the second visual content and/or other information. The characteristic(s) of the first visual content may be determined without assessment of the first visual content.

In some implementations, the characteristic(s) of the visual content may include one or more of an interest level, a filter tag, a content identification, and/or other information that characterizes the visual content.

In some implementations, the characteristic(s) of the visual content may be determined based on the one or more things depicted within the other visual content. For example, the characteristic(s) of the first visual content may be determined based on the one or more things depicted within the second visual content.

In some implementations, the characteristic(s) of the visual content may be determined based on audio content captured with the other visual content responsive to the other visual content being assessed to determine that the other visual content includes a dark image. For example, the second visual content may be assessed to determine that the second visual content includes a dark image. Responsive to the second visual content including the dark image, the characteristic(s) of the first visual content may be determined based on audio content captured with the second visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
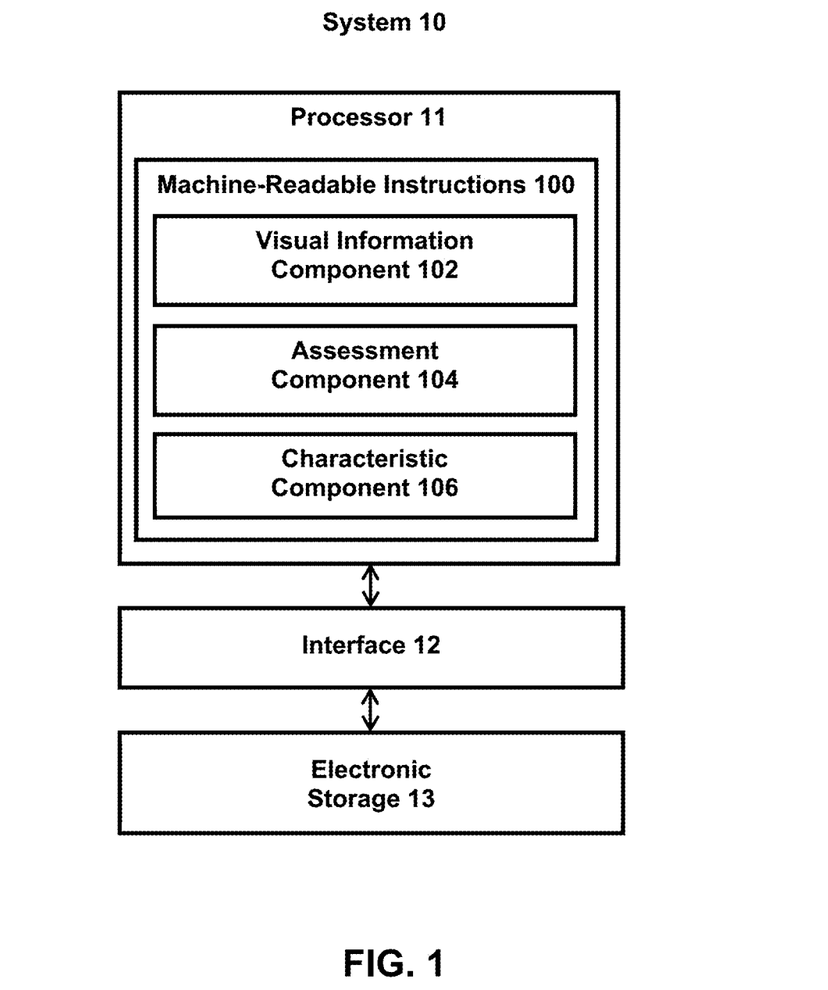
FIG. 1 illustrates an example system that characterizes visual content.

FIG. 1 illustrates a system 10 for characterizing visual content. The system 10 may include one or more of a processor 11, an interface 12 (e.g., bus, wireless interface), an electronic storage 13, and/or other components. Visual information other information may be obtained by the processor 11. The visual information may define visual content. The visual content may include first visual content, second visual content, and/or other visual content. The first visual content may be separate from the second visual content such that the second visual content is not presented during presentation of the first visual content. The second visual content may be assessed by the processor 11. The assessment of the second visual content may enable characterization of the first visual content without assessment of the first visual content. One or more characteristics of the first visual content may be determined by the processor 11 based on the assessment of the second visual content and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to assessment of visual content, information relating to characterization of visual content, and/or other information.

Visual content may refer to content of one or more images and/or one or more videos that may be consumed visually. Visual content may be captured by one or more images capture devices. For example, visual content may be defined within one or more images and/or one or more video frames of a video. For instance, video frame(s) of a video may define the visual content of the video. A video frame may include an I-frame, a P-frame, a B-frame, a frame of pixels, and/or other frames. Video frame(s) may define visual content viewable as a function of progress through a progress length of the video. A video frame may include an image of the video at a moment within the progress length of the video. Visual content may be generated based on light received within a field of view of a single image sensor or within fields of view of multiple image sensors during a capture period.

In some implementations, visual content may include wide-angle visual content. Wide-angle visual content may refer to visual content captured through use of one or more wide-angle optical elements, such as one or more wide-angle lens. In some implementations, wide-angle visual content may include a viewing angle of more than about 60 degrees. In some implementations, wide-angle visual content may include spherical visual content. Spherical visual content may include visual content viewable from one or more points of view (e.g., within a sphere, center of a sphere). Spherical visual content may refer to visual content generated through capture of multiple views from a single location. Spherical visual content may be captured through the use of one or more image capture devices to capture images from a location. The captured images may be stitched together to form the spherical visual content (spherical image). Spherical visual content may include full spherical visual content (360 degrees of capture) or partial spherical visual content (less than 360 degrees of capture). Partial spherical visual content may be referred to as panoramic visual content.

Figure 3:
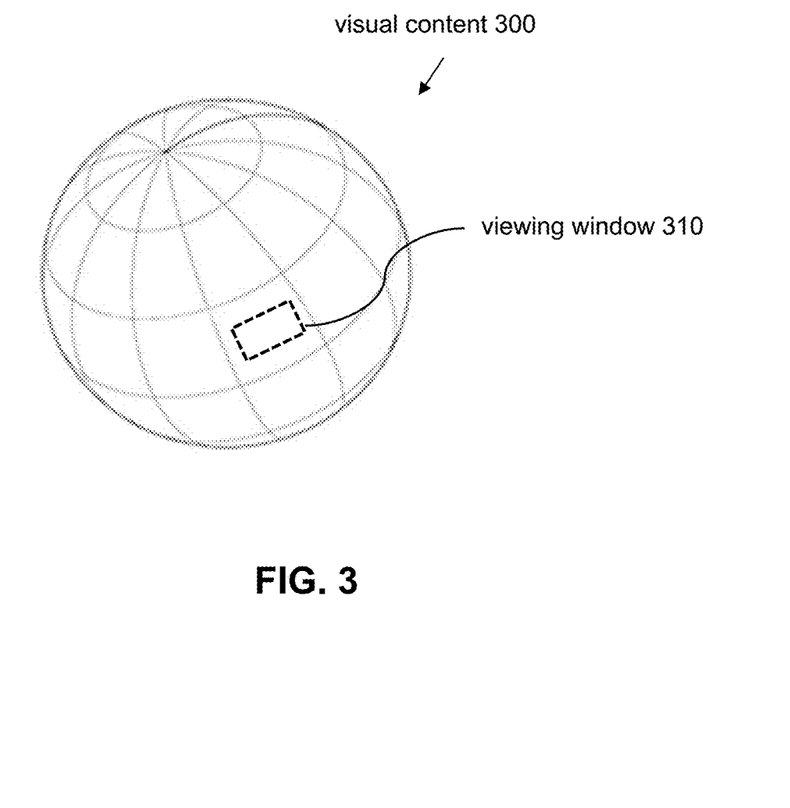
FIG. 3 illustrates an example spherical visual content.

FIG. 3 illustrates an example spherical visual content 300. The spherical visual content 300 may include visual content of a spherical image or a spherical video. The spherical visual content 300 may include visual content viewable from a point of view (e.g., center of sphere) as a function of progress through a progress length of the spherical visual content 300. The progress length of the visual content may be defined in terms of time durations and/or frame numbers. For example, a video may have a time duration of 60 seconds. Visual content of a video may be defined within 1800 video frames. A video having 1800 video frames may have a play time duration of 60 seconds when viewed at 30 frames per second. Other progress lengths, time durations, and frame numbers are contemplated.

One or more portions or entirely of the visual content 300 may be viewed at a time. For example, as shown in FIG. 3, a viewing window 310 may define a spatial extent of the visual content 300. The spatial extent of the visual content 300 within the viewing window may be presented (e.g., punched out) on one or more display while other spatial extents of the visual content 300 (outside the viewing window 310) may not be presented. That is, spatial extents of the visual content 300 outside the viewing window 310 may not be presented during the presentation of the spatial extent of the visual content 300 within the viewing window 310. The location, size, shape, and/or rotation of the viewing window 310 may be changed to present different spatial extents of the visual content 300.

An image capture device may refer to a device captures visual content. An image capture device may capture visual content in form of images, videos, and/or other forms. For example, an image capture device may refer to a camera and/or an image sensor. An image capture device may be a standalone device (e.g., camera) or may be part of another device (e.g., part of a smartphone). In some implementations, one or more components of the system 10 may be part of an image capture device. For example, one or more components of the system 10 may be carried by a housing, such as a housing of an image capture device.

In some implementations, visual content may be captured and/or associated with audio content. For example, audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate characterizing visual content. The machine-readable instructions 100 may include one or more computer program components. The machine-readable instructions 100 may include one or more of a visual information component 102, an assessment component 104, a characteristic component 106, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations.

The visual information component 102 may obtain visual information from one or more hardware components (e.g., an image sensor) and/or one or more software components (e.g., software running on a computing device). Visual information may be obtained during acquisition of the visual content and/or after acquisition of the visual content by one or more image capture devices. For example, the visual information component 102 may obtain visual information defining visual content while the visual content is being captured by an image capture device. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., image/video editing application, image/video player application), and/or other information. For example, a user interface/application may provide option(s) for a user to select one or more visual content that are to be opened, played, and/or characterized. The visual information defining the visual content may be obtained based on the user's selection of the visual content through the user interface/video application. Other selections of visual content for retrieval of visual information are contemplated.

Visual information may be stored within a single file or multiple files. For example, visual information defining visual content may be stored within a single image/video file, multiple image/video files, a combination of different files (e.g., a visual file and an audio file), and/or other files. Visual information may be stored in one or more formats or containers. A format may refer to one or more ways in which the information defining visual content is arranged/laid out (e.g., file format). A container may refer to one or more ways in which information defining visual content is arranged/laid out in association with other information (e.g., wrapper format).

Visual information may define visual content and/or other content. Visual information may define visual content and/or other content. The visual information may define visual content by including information that defines one or more content, qualities, attributes, features, and/or other aspects of the visual content. For example, the visual information may define visual content of an image, a video frame, and/or a video by including information that makes up the content of the image, the video frame, and/or the video, and/or information that is used to determine the content of the image, the video frame, and/or the video. For instance, the visual information may include information that makes up and/or is used to determine the arrangement of pixels, characteristics of pixels, values of pixels, and/or other aspects of pixels that define visual content of the image, the video frame, and/or the video. For example, the visual information may include information that makes up and/or is used to determine pixels of an image or video frame(s) of a video. Other types of visual information are contemplated.

The visual content may include separate visual content such that presentation of one visual content on a display does not include presentation of another visual content on the display. For example, the visual content may include first visual content, second visual content, and/or other visual content. Different visual content may be separate such that presentation of one visual content does not include presentation of other visual content. For example, the first visual content may be separate from the second visual content such that the second visual content is not presented during presentation of the first visual content.

Separate visual content may include different visual content that are temporally separated, spatially separated, and/or otherwise separated. Temporal separation between different visual content may include difference in capture times of the different visual content. Spatial separation between different visual content may include the different visual content depicting different portions of a scene. Different portions of the scene may be defined by pixels located at different positions within an image/video or being defined by pixels located within different images/videos. In some implementations, separate visual content may include different visual content that are temporally and/or spatially adjacent to one another.

Temporally separate visual content may include visual content captured at different moments. A moment may include a point in time or a duration of time. For example, the first visual content may be temporally separate from the second visual content. The first visual content may be captured at a first moment and the second visual content may be captured at a second moment different from the first moment.

Figure 4A:
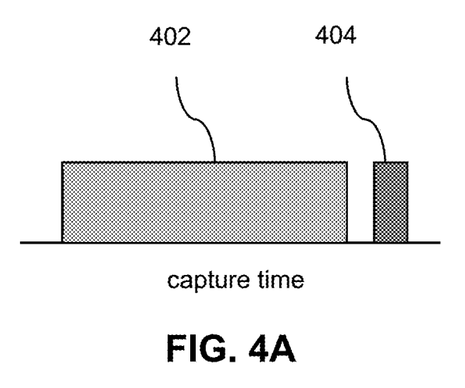
FIGS. 4A, 4B, 4C, and 4D illustrate examples of temporally separate visual content.

FIGS. 4A, 4B, 4C, and 4D illustrate examples of temporally separate visual content. FIG. 4A illustrates visual content 402, 404. The visual content 402 may be temporally separate from the visual content 404. The visual content 402, 404 may have been captured at different moments. The visual content 402 may have been captured at a moment, and following a pause in visual content capture, the visual content 404 may have been captured. For example, the visual content 402 may be visual content of a video captured by an image capture device. After the video is captured, there may be a break/pause in video capture before the capturing of the next video is started. The visual content 404 may be visual content of the next video captured by the image capture device.

Figure 4B:
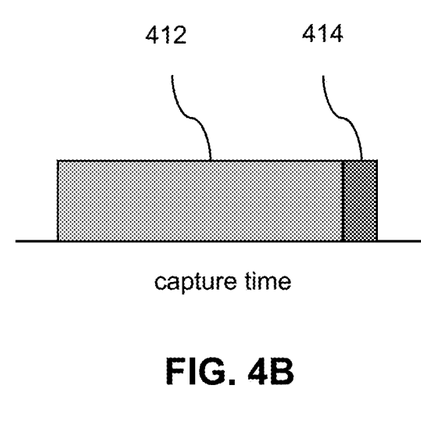

FIG. 4B illustrates visual content 412, 414. The visual content 412 may be temporally separate from the visual content 414. The visual content 412, 414 may have been captured at different moments. The visual content 414 may be temporally adjacent to the visual content 412. The visual content 412 may have been captured at a moment, and the visual content 414 may have been captured following the capture of the visual content 412. There may not be any break/pause in capture between capture of the visual content 412 and the capture of the visual content 414.

Figure 4C:
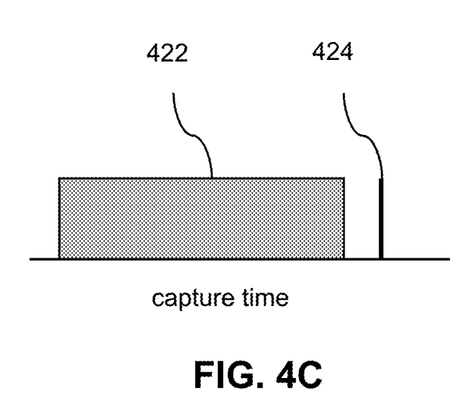

FIG. 4C illustrates visual content 422, 424. The visual content 422 may be temporally separate from the visual content 424. The visual content 422, 424 may have been captured at different moments. The visual content 422 may have been captured at a moment, and following a pause in visual content capture, the visual content 424 may have been captured. For example, the visual content 422 may be visual content of a video captured by an image capture device and the visual content 424 may be visual content of an image captured by the image capture device. After the video is captured, the image may be captured by the image capture device.

Figure 4D:
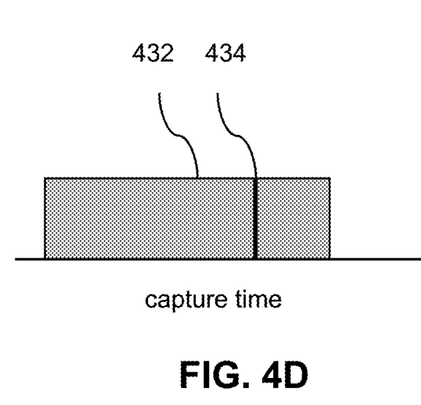

FIG. 4D illustrates visual content 432, 434. The visual content 434 may be temporally separate from portions of the visual content 424 preceding and following the moment at which the visual content 434 is captured. The visual content 434 may have been captured at a point in time within a capture duration of the visual content 432. For example, the visual content 432 may be visual content of a video captured by an image capture device and the visual content 434 may be visual content of an image captured by the image capture device during capture of the video. During capture of the video by the image capture device, the image capture device may have been used to capture the image. Other temporally separate visual content are contemplated.

Temporally separate visual content may be defined within a single video or within separate videos. For example, referring to FIG. 4B, the visual content 412 may be defined within one temporal portion of a video and the visual content 414 may be defined within another temporal portion of the video. The two temporal portions of the video may be adjacent in the progress length of the video. As another example, referring to FIG. 4A, the visual content 402 may be defined within one video and the visual content 404 may be defined within another video. The two videos may be sequentially captured by an image capture device.

Figure 5A:
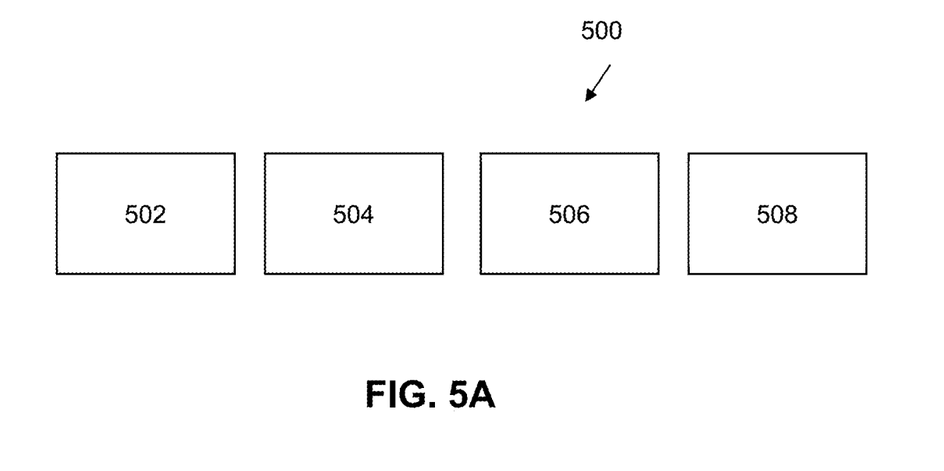
FIGS. 5A and 5B illustrate example views of visual content stored in separate files.
Figure 5B:
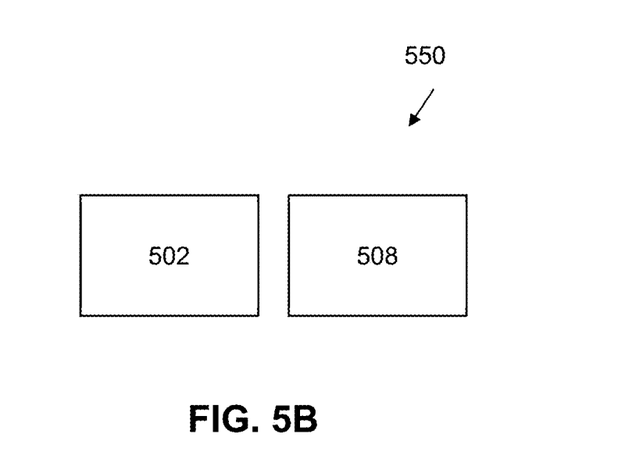

FIGS. 5A and 5B illustrate example views 500, 550 of visual content stored in separate files. The views 500, 550 may include views of visual content stored in image files and/or video files. For example, the views 500, 550 may correspond to views of images/video shown in a desktop application (e.g., folder view) or an image application (e.g., thumbnails organized in a grid). The view 500 shown in FIG. 5A may include presentation of all visual content captured by an image capture device. The visual content captured by the image capture device may be stored as video files 502, 504, 506, 508. The visual content of the video files 502, 504, 506, 508 may have been sequentially captured. For example, the visual content of the video file 502 may have been captured first, followed by the visual content of the video file 504, followed by the visual content of the video file 506, and followed by the visual content of the video file 508.

The visual content of the video file 504 may have been captured to characterize the visual content of the video file 502. The visual content of the video file 504 may be assessed to characterize (e.g., determine one or more characteristics of) the visual content of the video file 502. The visual content of the video file 506 may have been captured to characterize the visual content of the video file 508. The visual content of the video file 508 may be assessed to characterize the visual content of the video file 506.

In some implementations, visual content captured to characterize other separate visual content may be required to include a short capture duration or a certain capture duration. For example, for visual content to be identified and/or used as character visual content (visual content that characterizes other separate visual content), the visual content capture duration may be limited to a short duration of time (e.g., limited to a point in time, such as to capture an image; limited to a few seconds, such as to capture a short video). Limiting the capture duration of character visual content may enable filtering the views of the visual content to filter out of presentation of such visual content. For example, a user may not wish to see character visual content in a folder view or a media view. Limiting the capture duration of character visual content may enable the user to filter the viewing of visual content to those visual content having a capture duration longer than the limited capture duration used to capture character visual content. For example, the view 550 shown in FIG. 5B may exclude presentation of character visual content. For example, the view 550 may include presentation of visual content including capture duration or progress length longer than the limited duration used to capture character visual content. Filtering based on the length of the capture duration/progress length may result in the character visual content (e.g., the visual content 504, 506) not being shown within the view 550.

Spatially separate visual content may include visual content including depiction of different views of a scene. A scene may refer to a place in the real world. Different views of a scene may include views of the scene in different directions. Depiction of different views of a scene may include depiction of different parts of the scene. Depiction of different views of a scene may include views of the scene in different direction from a location of capture. For example, the first visual content may be spatially separate from the second visual content. The first visual content may include depiction of a first field of view of a scene and the second visual content may include depiction of a second field of view of a scene different from the first field of view of the scene. The size/extent of the first field of view may be same or different from the size/extent of the second field of view.

Spatially separate visual content may have been captured at same time or at different times. Spatially separate visual content may include temporally separate visual content and/or non-temporally separate visual content.

Figure 6A:
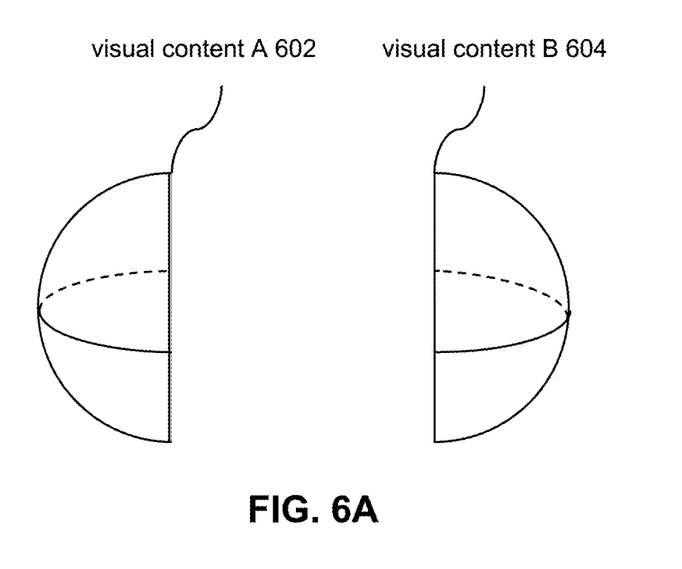
FIGS. 6A and 6B illustrate examples of spatially separate visual content.

FIGS. 6A and 6B illustrate examples of spatially separate visual content. FIG. 6A illustrates visual content A 602 and visual content B 604. The visual content A 602 may be spatially separate from the visual content B 604. The visual content A 602 and the visual content B 604 may include depiction of different parts of a scene. The visual content A 602 may include depiction of a view of the scene in one direction and the visual content B 604 may include depiction of a view of the scene in a different (e.g., opposing) direction. For example, the visual content A 602 may include one hemisphere of spherical visual content and the visual content B 604 may the other (opposing) hemisphere of the spherical visual content.

Figure 6B:
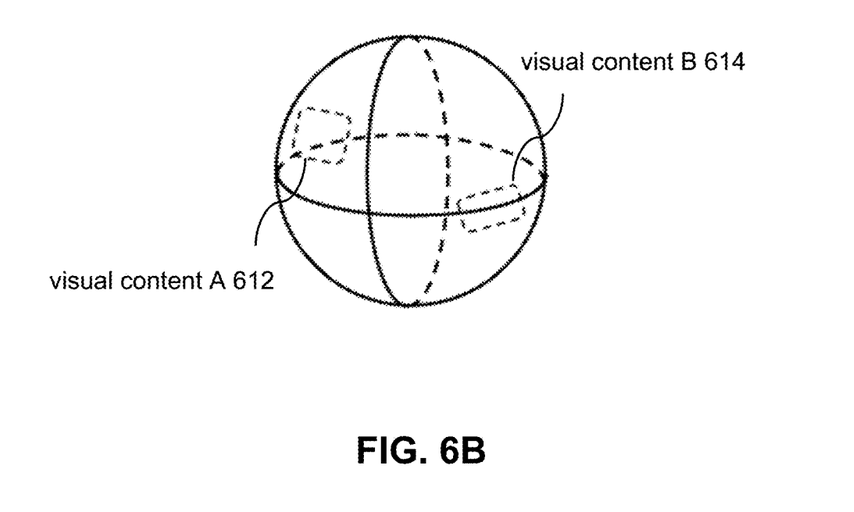

FIG. 6B illustrates visual content A 612 and visual content B 614. The visual content A 612 may be spatially separate from the visual content B 614. The visual content A 612 and the visual content B 614 may include depiction of different parts of a scene. The visual content A 612 and the visual content B 614 may include different extents of spherical visual content. The visual content A 612 may include depiction of a view of the scene in one direction and the visual content B 614 may include depiction of a view of the scene in a different direction from the center of the spherical visual content. Other spatially separate visual content are contemplated.

Spatially separate visual content may be defined within a single video/image or within separate videos/images. For example, referring to FIG. 6A, the visual content A 602 may be defined within one spatial portion of a spherical video/image and the visual content B 604 may be defined within another spatial portion of the spherical video/image. The two spatial portions of the spherical video/image may be opposite of each other. As another example, one visual content may be defined within a one video/image and another video content may be defined within another video/image. For instance, referring to FIG. 5A, one spatially separate visual content may be defined within the video file 502 and another spatially separate visual content may be defined within the video file 504.

Spatially separate visual content may be captured by a single image capture device or by separate image capture device. For example, two spatially separate visual content may be captured by a single image capture device, such as a spherical image capture device. A spherical image capture device may include one or more optical elements (e.g., lenses) that cover a spherical field of view surrounding the spherical image capture device, and may capture spherical visual content including depiction of things surrounding the spherical image capture device. As another example, two spatially separate visual content may be captured by two separate image capture devices. For instance, two spatially separate visual content may be captured by two cameras pointed in different directions (e.g., two separate cameras pointed in different directions, two cameras of a mobile device (e.g., outward facing camera, inward facing camera) pointed in different directions).

The assessment component 104 may be configured to assess at least one of the visual content. Assessment of one visual content may enable characterization of another temporally and/or spatially separate visual content without assessment of the other visual content. For example, the first visual content may be temporally and/or spatially separate from the second visual content. Assessment of the second visual content may enable characterization of the first visual content without assessment of the first visual content.

Assessment of one of the temporally separate visual content may enable characterization of another temporally separate visual content without assessment of the other temporally separate visual content. For example, assessment of visual content of an image, a video, and/or a video portion captured at a moment may enable characterization of temporally separate visual content of another image, another video, and/or another video portion captured at another moment. That is, one or more characteristics of visual content captured at one moment may be determined based on assessment of visual content captured at a different (e.g., preceding, following) moment.

For example, the assessment component 104 may assess the visual content 404 in FIG. 4A. Assessment of the visual content 404 may enable characterization of the visual content 402 without assessment of the visual content 402. The assessment component 104 may assess the visual content 414 in FIG. 4B. Assessment of the visual content 414 may enable characterization of the visual content 412 without assessment of the visual content 412. The assessment component 104 may assess the visual content 424 in FIG. 4C. Assessment of the visual content 424 may enable characterization of the visual content 422 without assessment of the visual content 422. The assessment component 104 may assess the visual content 434 in FIG. 4D. Assessment of the visual content 434 may enable characterization of the visual content 432 preceding the visual content 434 without assessment of the visual content 422 preceding the visual content 434. Assessment of the visual content 434 may enable characterization of the visual content 432 following the visual content 434 without assessment of the visual content 422 following the visual content 434.

The assessment component 104 may assess the visual content 504 in FIG. 5A. Assessment of the visual content 504 may enable characterization of the visual content 502 without assessment of the visual content 502. The assessment component 104 may assess the visual content 506 in FIG. 5A. Assessment of the visual content 506 may enable characterization of the visual content 508 without assessment of the visual content 508. Other assessments of temporally separate visual content are contemplated.

Assessment of one of the spatially separate visual content may enable characterization of another spatially separate visual content without assessment of the other spatially separate visual content. For example, assessment of visual content of a spatial portion of an image, a video, and/or a video portion may enable characterization of spatially separate visual content of another spatial portion of the image, video, and/or video portion. That is, one or more characteristics of visual content depicting one portion of a scene may be determined based on assessment of visual content depicting a different portion of the scene. For instance, for a spherical visual content, only a portion of the visual content may be shown and/or included within a non-spherical video. For example, referring to FIG. 3, only the portion of the visual content 300 within the viewing window 310 may be presented on a display and/or included within a non-spherical video. One or more other portions of the visual content 300 outside the viewing window 310, which may not be present on the display and/or included within the non-spherical video, may be assessed to determine one or more characteristics about the portion of the visual content 300 within the viewing window 310. For instance, non-exported portion of the visual content 300 may be assessed to determine information or features about the exported portion of the visual content 300.

For example, the assessment component 104 may assess the visual content A 602 in FIG. 6A. Assessment of the visual content A 602 may enable characterization of the visual content B 604 without assessment of the visual content B 604. The assessment component 104 may assess the visual content A 612 in FIG. 6B. Assessment of the visual content A 612 may enable characterization of the visual content B 614 without assessment of the visual content B 614.

Assessment of visual content may refer to analysis, calculation, determination, estimation, evaluation, examination, identification, retrieval, review, and/or other assessment of the content, nature, quality, and/or other features of the visual content. Assessment of visual content may include qualitative and/or quantitative assessment of the visual content. Assessment of visual content may include assessment of one or more pixels and/or one or more groupings of pixels that define the visual content. For example, assessment of visual content may include identification of one or more things depicted within the visual content and/or one or more things not depicted within the visual content. For example, the assessment component 14 may assess one or more of the visual content 404, 414, 424, 434, 504, 506, 602, 612 to identify one or more things depicted (defined by pixels) within the visual content. For instance, one or more visual analysis and/or computer vision techniques (e.g., face detection, person detection, emotion detection, form/shape detection, object detection, scene detection, block detection, action detection, activity detection, pose detection, saliency detection, scoring/priority analysis, color analysis, histogram analysis) may be performed to assess visual content. Assessment of the visual content may be performed during capture of the visual content and/or after capture of the visual content (e.g., during post-processing).

For example, referring to FIG. 6A, the visual content A 602 may include depiction of a user using an image capture device to capture an image or a video, with the subject (e.g., person, thing, activity, scene) of the image/video depicted within the visual content B 602. The user may visually indicate whether the image/video of the subject captured within the visual content B 604 is satisfactory and/or rate the goodness of the subject captured within the visual content B 604, and the user's visual indication may be depicted within the visual content A 602. For example, the user may show a thumbs up, show different numbers of fingers, smile, change attitude, make certain motion/pose, hold up a sign with keywords, and/or make other visual indications that are captured within the visual content A 602 to convey information characterizing the depiction captured within the visual content B 604. The depiction of the user's visual indication within the visual content A 602 may be assessed to characterize the visual content B 604 without assessment of the visual content B 604.

As another example, referring to FIG. 4A, the visual content 402 may include depiction of the subject of the image/video, and the visual content 404 may include depiction of things that characterize the visual content 402. For instance, the user may capture a certain scene and/or activity within the visual content 402. After capturing the scene/activity within the visual content 402, the user may visually indicate whether the image/video of the scene/activity captured within the visual content 402 is satisfactory and/or rate the goodness of the scene/activity captured within the visual content 402, and the user's visual indication may be depicted within the visual content 404. For example, the user may display a recognizable object and/or make a recognizable motion (e.g., holding up different number of fingers to indicate level of rating, high-fiving or hugging the subject or other person to indicate capture of good content) to be captured within the visual content 404 to convey information characterizing the depiction captured within the visual content 402. The depiction of the user's visual indication within the visual content 404 may be assessed to characterize the visual content 402 without assessment of the visual content 402. As shown in FIG. 4B, the character visual content (the visual content 414) may be a part (last moment) of a single video capture rather than separate video capture as shown in FIG. 4A. As shown in FIG. 4C and FIG. 4D, the character visual content (the visual content 424, 434) may be included within an image rather than a video. Other combinations of character visual content and visual content being characterized by the character visual content are contemplated.

In some implementations, the visual content may be assessed to determine whether or not the visual content includes one or more certain images, such as a dark image. A dark image may refer to a black image and/or an image with brightness/luminance below a certain brightness/luminance threshold. Responsive to the assessment determining that the visual content includes a dark image, audio content captured with the visual content may be assessed. The assessment of the audio content may enable characterization of separate visual content without assessment of the separate visual content. Use of other image detection (e.g., images depicting certain keyword(s), images depicting certain object(s)/shape(s)) to perform audio content assessment are contemplated.

For example, referring to FIG. 4A, the visual content 402 may include depiction of the subject of the image/video, and the visual content 404 may include a dark image (e.g., based on the user covering the lens of the image capture device during capture of the visual content 404, pointing the image capture device to a dark image). For instance, the user may capture a certain scene and/or activity within the visual content 402. After capturing the scene/activity within the visual content 402, the user may capture the visual content 404 by covering the lens of the image capture device. During capture of the visual content 404, the user may make audible indications that are captured during capture of the visual content 404 to convey information characterizing the depiction captured within the visual content 402. For example, the user may speak one or more keywords that describe one or more characteristics of the depiction captured within the visual content 402. Audio analysis (e.g., voice detection, command detection) may be performed for the audio content captured during capture of the visual content 404 to extract the information characterizing the depiction captured within the visual content 402 from the audio content. Other assessments of visual content are contemplated.

In some implementations, the assessment component 104 may be configured to identify visual content (character visual content) that enables characterization of other temporally and/or spatially separate visual content without assessment of the other visual content. For example, the character visual content may be limited to a certain capture duration (e.g., capture duration of a few seconds) and the assessment component 104 may identify character visual content based on the capture duration/progress length of the visual content as those visual content having the capture duration/progress length less than the certain capture duration. As another example, character visual content may be limited to a certain portion of the capture duration of the video (e.g., a few seconds in the beginning or the ending of the video). As another example, visual content may be tagged and/or otherwise labeled as character visual content by the image capture device. For example, visual content captured by the image capture device may be tagged/labeled as character visual content based on the visual content being captured via user interaction with one or more camera buttons/elements for capturing character visual content.

For example, the image capture device may have a button/element for capturing regular visual content and another button/element for capturing character visual content. As another example, the image capture device may have one or more other buttons/elements to be interacted by the user in addition to the record button/element to capture character visual content. As another example, the image capture device may distinguish between different interactions of the record button/element to distinguish between capture of regular visual content and character visual content (e.g., press-and-release to record regular visual content versus press-and-hold to record character visual content, pressing once to record regular visual content versus pressing multiple times within a short period of time to record character visual content). Other identifications of character visual content are contemplated.

Identification of character visual content may provide resource savings (e.g., processing power, bandwidth, time) when assessing visual content. Identifying character visual content may enable the assessment component 104 to assess the character visual content without assessing other visual content. For example, visual analysis may be only performed by the assessment component 104 on the character visual content rather than the entirety of the visual content.

The characteristic component 106 may be configured to determine one or more characteristics of at least one of the visual content based on the assessment of another visual content and/or other information. The characteristic(s) of the visual content may be determined based on assessment of another temporally and/or spatially separate visual content. The characteristic(s) of the visual content may be determined without assessment of the visual content. For example, the characteristic component 106 may be configured to determine one or more characteristics of the first visual content based on the assessment of the second visual content temporally and/or spatially separate from the first visual content, and/or other information. The characteristic(s) of the first visual content may be determined without assessment of the first visual content. The characteristic(s) of visual content determined by the characteristic component 106 may be stored in one or more storage media (e.g., the electronic storage 13, storage media remote from the system). The characteristic(s) of the visual content may be stored with the visual content and/or as metadata for the visual content.

For example, the characteristic component 106 may determine characteristic(s) of the visual content 402 in FIG. 4A based on the assessment of the visual content 404 and without assessment of the visual content 402. The characteristic component 106 may determine characteristic(s) of the visual content 412 in FIG. 4B based on the assessment of the visual content 414 and without assessment of the visual content 412. The characteristic component 106 may determine characteristic(s) of the visual content 422 in FIG. 4C based on the assessment of the visual content 424 and without assessment of the visual content 422. The characteristic component 106 may determine characteristic(s) of the portion of the visual content 432 preceding the visual content 434 in FIG. 4D based on the assessment of the visual content 434 and without assessment of the visual content 432. The characteristic component 106 may determine characteristic(s) of the portion of the visual content 432 following the visual content 434 in FIG. 4D based on the assessment of the visual content 434 and without assessment of the visual content 432.

The characteristic component 106 may determine characteristic(s) of the visual content 502 in FIG. 5A based on the assessment of the visual content 504 and without assessment of the visual content 502. The characteristic component 106 may determine characteristic(s) of the visual content 508 in FIG. 5A based on the assessment of the visual content 506 and without assessment of the visual content 508. The characteristic component 106 may determine characteristic(s) of the visual content B 604 in FIG. 6A based on the assessment of the visual content A 602 and without assessment of the visual content B 604. The characteristic component 106 may determine characteristic(s) of the visual content B 614 in FIG. 6A based on the assessment of the visual content A 612 and without assessment of the visual content B 614. Other determinations of characteristic(s) of visual content based on assessment of temporally and/or spatially separate visual content are contemplated.

In some implementations, the characteristic(s) of the visual content may be determined based on the one or more things depicted within the other temporally and/or spatially separate visual content. For example, the characteristic(s) of the visual content B 604 in FIG. 6A may be determined based on one or more things depicted within the visual content A 602.

In some implementations, the characteristic(s) of the visual content may be determined based on audio content captured with the other temporally and/or spatially visual content responsive to the other visual content being assessed to determine that the other visual content includes one or more certain images, such as a dark image. For example, the visual content 404 in FIG. 4A may be assessed to determine that the visual content 404 includes a dark image. Responsive to the visual content 404 including the dark image, the characteristic(s) of the visual content 402 may be determined based on audio content (e.g., audio analysis of the audio content, such as voice detection, command detection) captured with the visual content 404.

A characteristic of visual content may refer to one or more features and/or one or more qualities of the visual content. A characteristic of visual content may characterize, indicate, and/or provide information on one or more depictions within the visual content. For example, a characteristic of visual content may include one or more of an interest level, a filter tag, a content identification, and/or other information that characterizes the visual content. An interest level of visual content may indicate goodness (e.g., quality, desirability, likelihood of being interesting to a user) of the depictions within the visual content. A filter tag may indicate whether the corresponding visual content should or should not be filtered from inclusion in views of images/videos (e.g., in a desktop or image application), from inclusion in a presentation of visual content on one or more displays, from inclusion in generation of a summary visual content, and/or from inclusion in other groupings of visual content. A content identification may indicate the identity of subject or things depicted within the visual content. Other characteristics of visual content are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
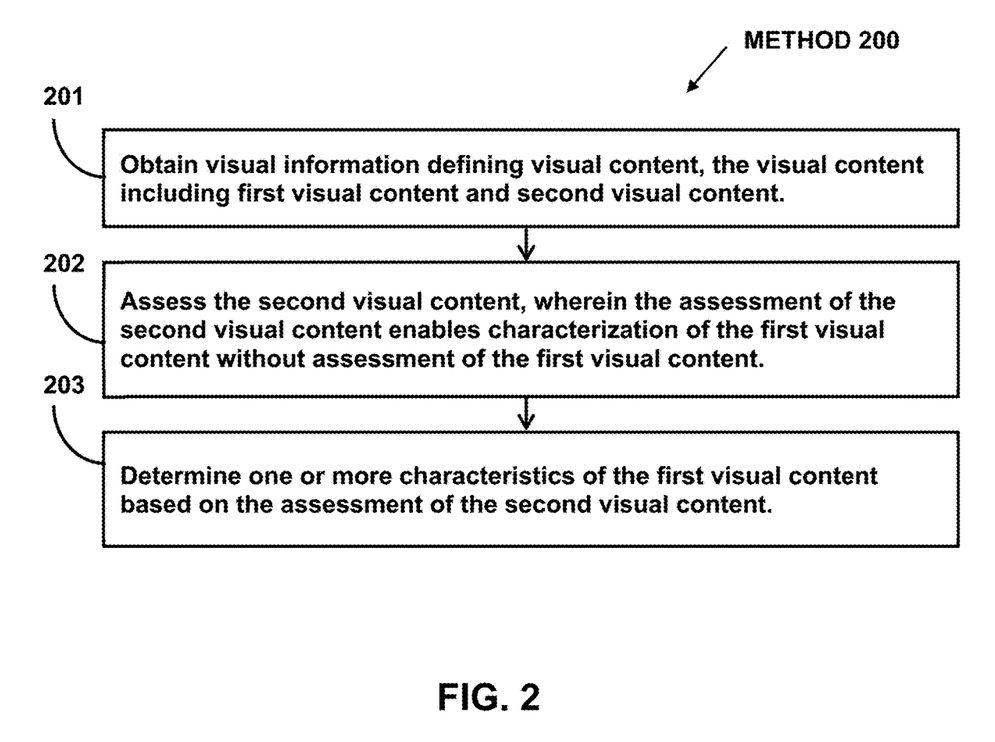
FIG. 2 illustrates an example method for characterizing visual content.

FIG. 2 illustrates method 200 for characterizing visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information defining visual content and/or other information may be obtained. The visual content may include first visual content, second visual content, and/or other visual content. The first visual content may be separate from the second visual content such that the second visual content is not presented during presentation of the first visual content. In some implementation, operation 201 may be performed by a processor component the same as or similar to the visual information component 102 (Shown in FIG. 1 and described herein).

At operation 202, the second visual content may be assessed. The assessment of the second visual content may enable characterization of the first visual content without assessment of the first visual content. In some implementation, operation 202 may be performed by a processor component the same as or similar to the assessment component 104 (Shown in FIG. 1 and described herein).

At operation 203, one or more characteristics of the first visual content may be determined based on the assessment of the second visual content and/or other information. In some implementation, operation 203 may be performed by a processor component the same as or similar to the characteristic component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for characterizing visual content, the system comprising:
   one or more physical processors configured by machine-readable instructions to:
   obtain visual information defining visual content, the visual content including first visual content and second visual content, wherein the first visual content is separate from the second visual content such that the second visual content is not presented during presentation of the first visual content;
   assess the second visual content, wherein the second visual content is assessed to identify one or more things depicted within the second visual content, wherein the assessment of the second visual content enables characterization of the first visual content without assessment of the first visual content; and
   determine one or more characteristics of the first visual content based on the assessment of the second visual content, wherein the one or more characteristics of the first visual content are determined based on the one or more things depicted within the second visual content.

2. The system of claim 1, wherein the first visual content is temporally separate from the second visual content, the first visual content captured at a first moment and the second visual content captured at a second moment different from the first moment.

3. The system of claim 2, wherein the first visual content is defined within a first temporal portion of a video and the second visual content is defined within a second temporal portion of the video, the first temporal portion of the video being adjacent to the second temporal portion of the video.

4. The system of claim 2, wherein the first visual content is defined within a first video and the second visual content is defined within a second video, the first video and the second video sequentially captured by an image capture device.

5. The system of claim 1, wherein the first visual content is spatially separate from the second visual content, the first visual content including depiction of a first field of view of a scene and the second visual content including depiction of a second field of view of a scene different from the first field of view of the scene.

6. The system of claim 5, wherein the first visual content is defined within a first spatial portion of a spherical video and the second visual content is defined within a second spatial portion of the spherical video, the first spatial portion of the spherical video being opposite of the second spatial portion of the spherical video.

7. The system of claim 5, wherein the first visual content is captured by a first image capture device and the second visual content is captured by a second image capture device.

8. The system of claim 1, wherein:
   the second visual content is assessed to determine that the second visual content includes a dark image;
   responsive to the second visual content including the dark image, the one or more characteristics of the first visual content are determined based on audio content captured with the second visual content.

9. The system of claim 1, wherein the one or more characteristics of the first visual content include one or more of an interest level, a filter tag, and/or a content identification of the first visual content.

10. A method for characterizing visual content, the method performed by a computing system including one or more processors, the method comprising:
    obtaining, by the computing system, visual information defining visual content, the visual content including first visual content and second visual content, wherein the first visual content is separate from the second visual content such that the second visual content is not presented during presentation of the first visual content;
    assessing, by the computing system, the second visual content, wherein the second visual content is assessed to identify one or more things depicted within the second visual content, wherein the assessment of the second visual content enables characterization of the first visual content without assessment of the first visual content; and
    determining, by the computing system, one or more characteristics of the first visual content based on the assessment of the second visual content, wherein the one or more characteristics of the first visual content are determined based on the one or more things depicted within the second visual content.

11. The method of claim 10, wherein the first visual content is temporally separate from the second visual content, the first visual content captured at a first moment and the second visual content captured at a second moment different from the first moment.

12. The method of claim 11, wherein the first visual content is defined within a first temporal portion of a video and the second visual content is defined within a second temporal portion of the video, the first temporal portion of the video being adjacent to the second temporal portion of the video.

13. The method of claim 11, wherein the first visual content is defined within a first video and the second visual content is defined within a second video, the first video and the second video sequentially captured by an image capture device.

14. The method of claim 10, wherein the first visual content is spatially separate from the second visual content, the first visual content including depiction of a first field of view of a scene and the second visual content including depiction of a second field of view of a scene different from the first field of view of the scene.

15. The method of claim 14, wherein the first visual content is defined within a first spatial portion of a spherical video and the second visual content is defined within a second spatial portion of the spherical video, the first spatial portion of the spherical video being opposite of the second spatial portion of the spherical video.

16. The method of claim 14, wherein the first visual content is captured by a first image capture device and the second visual content is captured by a second image capture device.

17. The method of claim 10, wherein:
the second visual content is assessed to determine that the second visual content includes a dark image;
responsive to the second visual content including the dark image, the one or more characteristics of the first visual content are determined based on audio content captured with the second visual content.

18. The method of claim 10, wherein the one or more characteristics of the first visual content include one or more of an interest level, a filter tag, and/or a content identification of the first visual content.

* * * * *